(No Model.)

C. M. ALEXANDER.
HORSESHOE.

No. 327,752. Patented Oct. 6, 1885.

WITNESSES
Edwin L. Jewell.
J. J. McCarthy.

INVENTOR
C. M. Alexander

UNITED STATES PATENT OFFICE.

C. MADISON ALEXANDER, OF BRIGHTWOOD, DISTRICT OF COLUMBIA.

HORSESHOE.

SPECIFICATION forming part of Letters Patent No. 327,752, dated October 6, 1885.

Application filed November 11, 1884. Serial No. 147,646. (No model.)

*To all whom it may concern:*

Be it known that I, C. MADISON ALEXANDER, a citizen of the United States, residing at Brightwood, in the District of Columbia, have invented certain new and useful Improvements in Horseshoes, of which the following is a specification, reference being had therein to the accompanying drawings.

My invention relates to improvements in horseshoes, and has for its objects to provide an auxiliary shoe to contain removable and renewable calks, which can be easily and quickly attached to or detached from a shoe already secured to a horse's hoof. The device is adapted to be fitted to a horseshoe, and in "slippery" weather is very advantageous, since it can be readily supplied with sharp calks. The essential feature that makes this invention practical is the band which clasps the heels of the primary and the auxiliary shoe. This band holds the two shoes together firmly, while there is little or no strain upon it. Any simple means—such as a strap riveted to it and passed around the hoof of the horse—may be used to keep it in place. Further, the cost of the calks being merely nominal, they can be renewed every time the horse is taken out, and all danger of injury obviated thereby.

Figure 1:
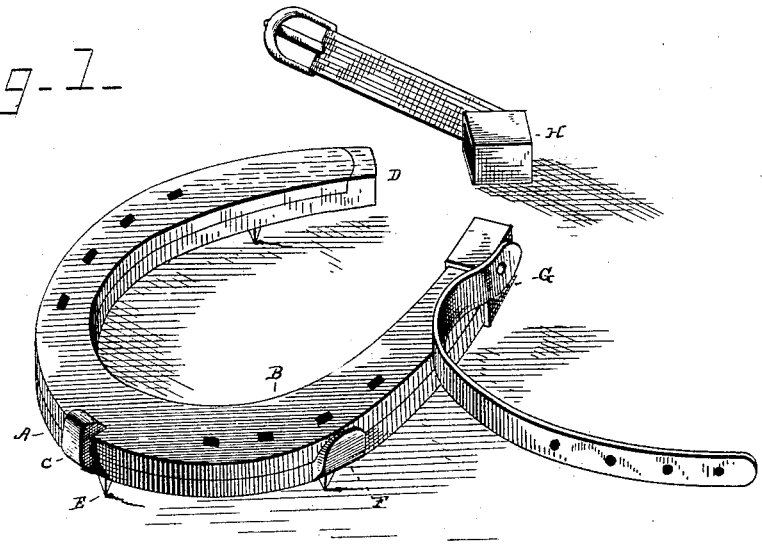
Figure 2:
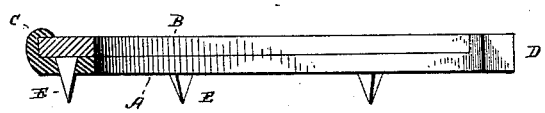
Figure 3:

In describing the device reference is had to the annexed drawings, in which Figure 1 represents a perspective view of the device applied to a horseshoe; Fig. 2, a longitudinal section through Fig. 1, and Fig. 3 a perspective of one of the calks.

A designates a horseshoe of ordinary construction without the usual calks. On the under side is adapted to fit an auxiliary shoe, B, having an inwardly-turned toe-clip, C, which engages over the toe of the shoe A, between it and the horse's hoof. Upwardly-turned heel-pieces D are grooved, channeled, or otherwise arranged to prevent lateral motion, the heels of the shoe being correspondingly formed to fit. The preferable mode is to round the heels of the shoe and concave the heel-pieces D, this being the most easily and economically formed construction.

The auxiliary shoe is provided with a series of V or other shaped openings to admit the insertion of the calks E, which are of such shape as to be adapted to be dropped into the openings and project beyond the auxiliary shoe, the primary shoe holding them in place by resting on their enlarged ends.

Flanges F are provided on each side the shoe B to further prevent lateral motion.

The two parts having been placed together as shown in Fig. 1, a sleeve, G, having a strap with holes in it, is slipped over one heel, and a sleeve, H, with a strap containing a buckle, is slipped over the other heel. The toe-clip will give the heel of one shoe a slight tendency to spring away from the other, so it will cause the sleeve to fit snug, and the sleeve is made beveled internally, so that it will pass on the shoes only far enough to thoroughly secure them together.

The straps are secured around the hoof and serve to keep the sleeves from working off the shoes.

Having described the device, what I claim is—

1. A metallic or other suitable band, in combination with a primary and an auxiliary horseshoe, to bind the same together at their heels, straps or other suitable means being used to keep the bands in place, substantially as set forth.

2. An auxiliary and detachable horseshoe having an upwardly and inwardly turned toe-clip, an upwardly-turned close-fitting heel-piece, and a series of openings in its surface to receive and retain detachable calks adapted to be dropped in from its upper side, in combination with bands to confine its heels to a primary shoe, as and for the purpose set forth.

3. An auxiliary and detachable horseshoe having an upwardly and inwardly turned toe-clip, an upwardly-turned close-fitting curved heel-piece to embrace the heel of the primary shoe, and bands to embrace the heels of both shoes, substantially as and for the purpose set forth.

In testimony whereof I affix my signature in presence of three witnesses.

C. M. ALEXANDER.

Witnesses:
CHAS. D. DAVIS,
EDWIN L. YEWELL,
J. J. MCCARTHY.